(12) United States Patent
Fletcher

(10) Patent No.: US 9,374,675 B2
(45) Date of Patent: Jun. 21, 2016

(54) PUBLIC SERVICE AWARENESS OF CROWD MOVEMENT AND CONCENTRATION

(71) Applicant: International Business Machines Corporation, Armonk, NY (US)

(72) Inventor: James C. Fletcher, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/534,319

(22) Filed: Nov. 6, 2014

(65) Prior Publication Data

US 2016/0135015 A1    May 12, 2016

(51) Int. Cl.
*H04W 24/00*      (2009.01)
*H04W 4/04*      (2009.01)
*H04W 4/02*      (2009.01)

(52) U.S. Cl.
CPC ............... *H04W 4/04* (2013.01); *H04W 4/027* (2013.01)

(58) Field of Classification Search
USPC ................. 455/456.1, 422.1, 456.2, 456.3
See application file for complete search history.

(56) References Cited

U.S. PATENT DOCUMENTS

| | | | | |
|---|---|---|---|---|
| 7,742,769 B2 * | 6/2010 | Goodman | ............. | H04W 24/00 455/2.01 |
| 8,301,112 B2 * | 10/2012 | Morrison | ......... | G08G 1/096725 455/404.2 |
| 8,314,683 B2 * | 11/2012 | Pfeffer | ................. | G08B 25/006 340/539.13 |
| 8,442,807 B2 * | 5/2013 | Ramachandran | ....... | H04W 4/02 703/2 |
| 8,560,608 B2 * | 10/2013 | Petersen | ........... | G06F 17/30867 455/435.1 |
| 2010/0198917 A1 | 8/2010 | Petersen et al. | | |
| 2010/0205542 A1 * | 8/2010 | Walman | ................. | G06Q 10/10 715/753 |
| 2010/0285814 A1 * | 11/2010 | Price | ......................... | G01S 5/14 455/456.1 |
| 2013/0059608 A1 * | 3/2013 | Cuff | .................... | H04W 64/006 455/456.5 |
| 2014/0018097 A1 * | 1/2014 | Goldstein | ........... | G06F 19/3406 455/456.1 |
| 2015/0032366 A1 * | 1/2015 | Man | ....................... | G08G 1/095 701/412 |

FOREIGN PATENT DOCUMENTS

WO      2013134863 A1    9/2013

OTHER PUBLICATIONS

Disclosed Anonymously, "Crowd-sourced mobile application recommendations in the cloud", IP.com No. IPCOM000225914D, Electronic Publication: Mar. 12, 2013.

(Continued)

*Primary Examiner* — Vladimir Magloire
*Assistant Examiner* — Sayed T Zewari
(74) *Attorney, Agent, or Firm* — Robert C. Bunker; Michael A. Petrocelli

(57) ABSTRACT

According to one exemplary embodiment, a method for predicting crowd formation based on the movement of a plurality of mobile devices is provided. The method may include collecting a plurality of location data snapshots based on the plurality of mobile devices and a plurality of cell towers. The method may include determining a plurality of device positions based on the collected plurality of location data snapshots. The method may include determining a device movement direction based on the determined plurality of device positions. The method may include determining a device velocity based on the determined plurality of device positions. The method may include identifying a mobile device subset, whereby the mobile device subset converges on a convergence area. The method may include determining if the mobile device subset converging on the convergence area exceeds a threshold value. The method may include triggering a convergence response.

20 Claims, 3 Drawing Sheets

(56) References Cited

OTHER PUBLICATIONS

Disclosed Anonymously, "Intelligent notification system based on crowd sourcing and current activities", IP.com No. IPCOM000230074D, Electronic Publication: Aug. 17, 2013.

IBM, Vodafone Global Enterprise, "City in Motion", Leveraging people & traffic movement data to enhance public services, Jan. 2011, pp. 1-7.

* cited by examiner

PUBLIC SERVICE AWARENESS OF CROWD MOVEMENT AND CONCENTRATION

BACKGROUND

The present invention relates generally to the field of computing, and more particularly to tracking electronic devices using cell towers.

Mobile cellular devices, such as smartphones, utilize cell towers located at fixed geographic points to relay voice and data transmissions between a mobile cellular device and a cellular network. Cellular network signal strength between a mobile cellular device and a cell tower depends in part on the physical distance between the mobile cellular device and the cell tower. While a mobile cellular device may move away from a first cell tower reducing signal strength to the first cell tower, the mobile cellular device may also move closer to a second cell tower increasing signal strength to the second cell tower. At any given instant, the mobile cellular device may communicate with multiple cell towers in order to seamlessly handoff voice and data transmissions from one cell tower to another cell tower as the mobile cellular device moves. By utilizing the signal strength information from multiple cell towers with known fixed geographic locations, a mobile cellular device's geographic location may be determined by triangulation.

SUMMARY

According to one exemplary embodiment, a method for predicting crowd formation based on the movement of a plurality of mobile devices is provided. The method may include collecting a plurality of location data snapshots based on the plurality of mobile devices and a plurality of cell towers. The method may also include determining a plurality of device positions corresponding with each mobile device within the plurality of mobile devices based on the collected plurality of location data snapshots. The method may then include determining a device movement direction corresponding with each mobile device within the plurality of mobile devices based on the determined plurality of device positions. The method may further include determining a device velocity corresponding with each mobile device within the plurality of mobile devices based on the determined plurality of device positions. The method may include identifying a mobile device subset within the plurality of mobile devices, whereby the mobile device subset converges on a convergence area based on the determined device velocity corresponding with each mobile device within the plurality of mobile devices. The method may also include determining if the mobile device subset within the plurality of mobile devices converging on the convergence area exceeds a threshold value. The method may then include triggering a convergence response based on determining the mobile device subset converging on the convergence area exceeds the threshold value.

According to another exemplary embodiment, a computer system for predicting crowd formation based on the movement of a plurality of mobile devices is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include collecting a plurality of location data snapshots based on the plurality of mobile devices and a plurality of cell towers. The method may also include determining a plurality of device positions corresponding with each mobile device within the plurality of mobile devices based on the collected plurality of location data snapshots. The method may then include determining a device movement direction corresponding with each mobile device within the plurality of mobile devices based on the determined plurality of device positions. The method may further include determining a device velocity corresponding with each mobile device within the plurality of mobile devices based on the determined plurality of device positions. The method may include identifying a mobile device subset within the plurality of mobile devices, whereby the mobile device subset converges on a convergence area based on the determined device velocity corresponding with each mobile device within the plurality of mobile devices. The method may also include determining if the mobile device subset within the plurality of mobile devices converging on the convergence area exceeds a threshold value. The method may then include triggering a convergence response based on determining the mobile device subset converging on the convergence area exceeds the threshold value.

According to yet another exemplary embodiment, a computer program product for predicting crowd formation based on the movement of a plurality of mobile devices is provided. The computer program product may include one or more computer-readable storage devices and program instructions stored on at least one of the one or more tangible storage devices, the program instructions executable by a processor. The computer program product may include program instructions to collect a plurality of location data snapshots based on the plurality of mobile devices and a plurality of cell towers. The computer program product may also include program instructions to determine a plurality of device positions corresponding with each mobile device within the plurality of mobile devices based on the collected plurality of location data snapshots. The computer program product may then include program instructions to determine a device movement direction corresponding with each mobile device within the plurality of mobile devices based on the determined plurality of device positions. The computer program product may further include program instructions to determine a device velocity corresponding with each mobile device within the plurality of mobile devices based on the determined plurality of device positions. The computer program product may include program instructions to identify a mobile device subset within the plurality of mobile devices, whereby the mobile device subset converges on a convergence area based on the determined device velocity corresponding with each mobile device within the plurality of mobile devices. The computer program product may also include program instructions to determine if the mobile device subset within the plurality of mobile devices converging on the convergence area exceeds a threshold value. The computer program product may then include program instructions to trigger a convergence response based on determining the mobile device subset converging on the convergence area exceeds the threshold value.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
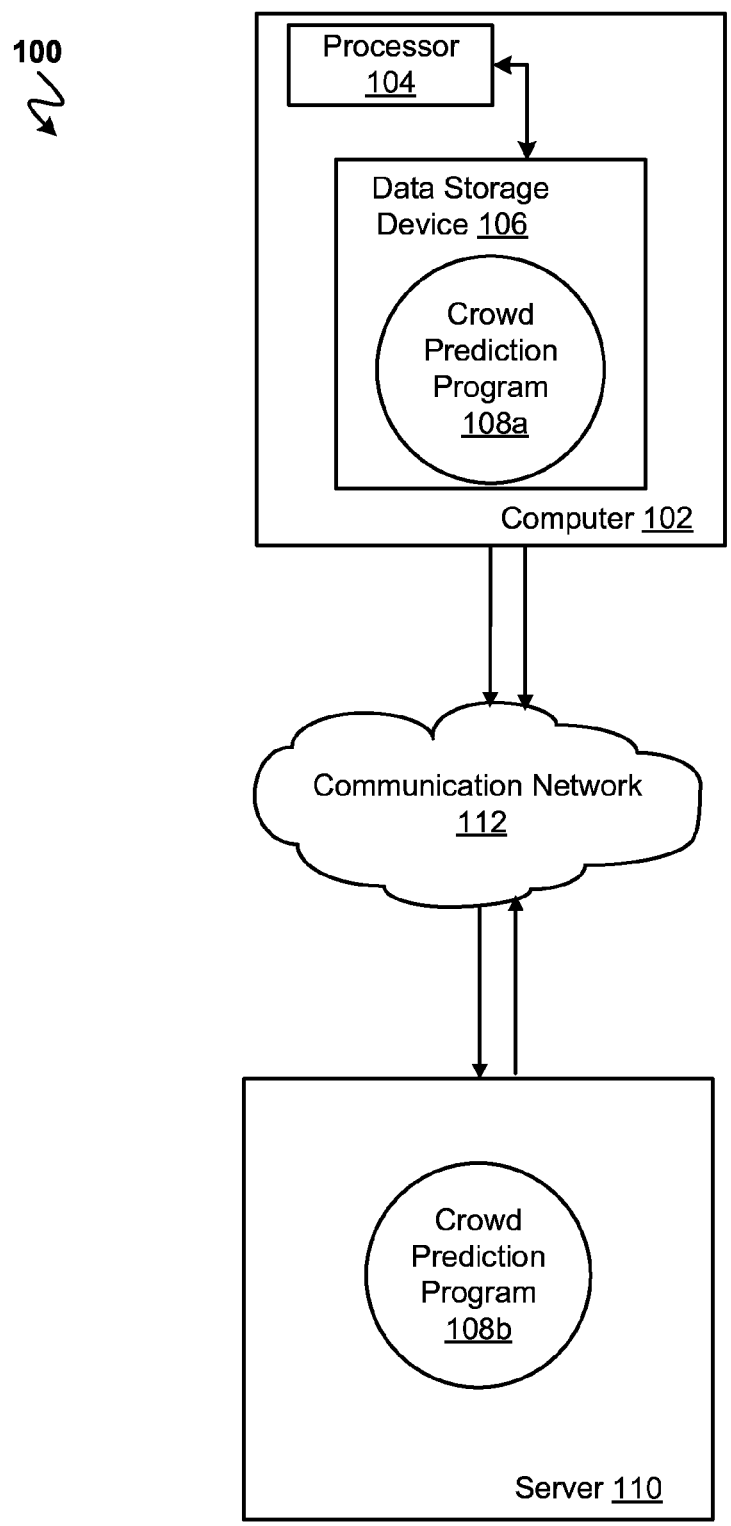
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for determining crowd movement and concentration based on mobile device position.

As previously described, the geographic location of a mobile cellular device, such as a smartphone, may be determined based on the signal strength between the mobile cellular device and multiple cell towers detecting the presence of the mobile cellular device. By tracking the position, direction and velocity of movement of the mobile cellular device, the position, direction and velocity of movement of the mobile cellular device's user may be inferred.

Large groups of people congregating without prior notice may create safety hazards. Many people may coordinate, through means such as social media, to meet at a designated location to congregate. Thus, large crowds of people may form without prior notice to government personnel or law enforcement creating safety hazards in the areas the crowds form and to the people making up the crowd. Crowds may also form with criminal intentions quickly enough to perpetrate criminal acts without law enforcement having sufficient time to effectively handle the situation. Many people that make up such crowds carry mobile cellular devices on their person while travelling to the designated location to meet.

Therefore, it may be advantageous to, among other things, provide a way to predict if a large crowd may form at a target location based on tracking the mobile cellular devices that the people travelling to the target location are carrying.

According to at least one embodiment, predicting crowd formation based on mobile cellular device location may be implemented by periodically collecting cellular signal strength data from multiple cell towers. By triangulating the signal strength between multiple towers and a mobile cellular device, the mobile cellular device's current location may be determined. Additionally, by recording a mobile cellular device's previous determined locations and the time that the mobile cellular device was at the previously determined locations, the direction and velocity of movement for the mobile cellular device may be calculated. Once mobile cellular device direction and velocity of movement are calculated, the calculated data for multiple mobile cellular devices may be aggregated to determine directional convergence for sets of mobile cellular devices. If the number of mobile cellular devices determined to be converging on a common target area exceed a predefined threshold value, a notification may be generated and sent to a target entity, such as a government agency, to inform the target entity of a possible crowd gathering along with ancillary collected and determined data.

Referring now to FIG. 1, an exemplary networked computer environment 100 in accordance with one embodiment is depicted. The networked computer environment 100 may include a computer 102 with a processor 104 and a data storage device 106 that is enabled to run a crowd prediction program 108a. The networked computer environment 100 may also include a server 110 that is enabled to run a crowd prediction program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 3, server computer 110 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a crowd prediction program 108a and 108b may run on the client computer 102 or on the server computer 110. The crowd prediction program 108a and 108b may be used to predict crowd formation based on mobile cellular device direction and velocity of movement. The crowd prediction program 108a and 108b is explained in further detail below with respect to FIG. 2.

Figure 2:
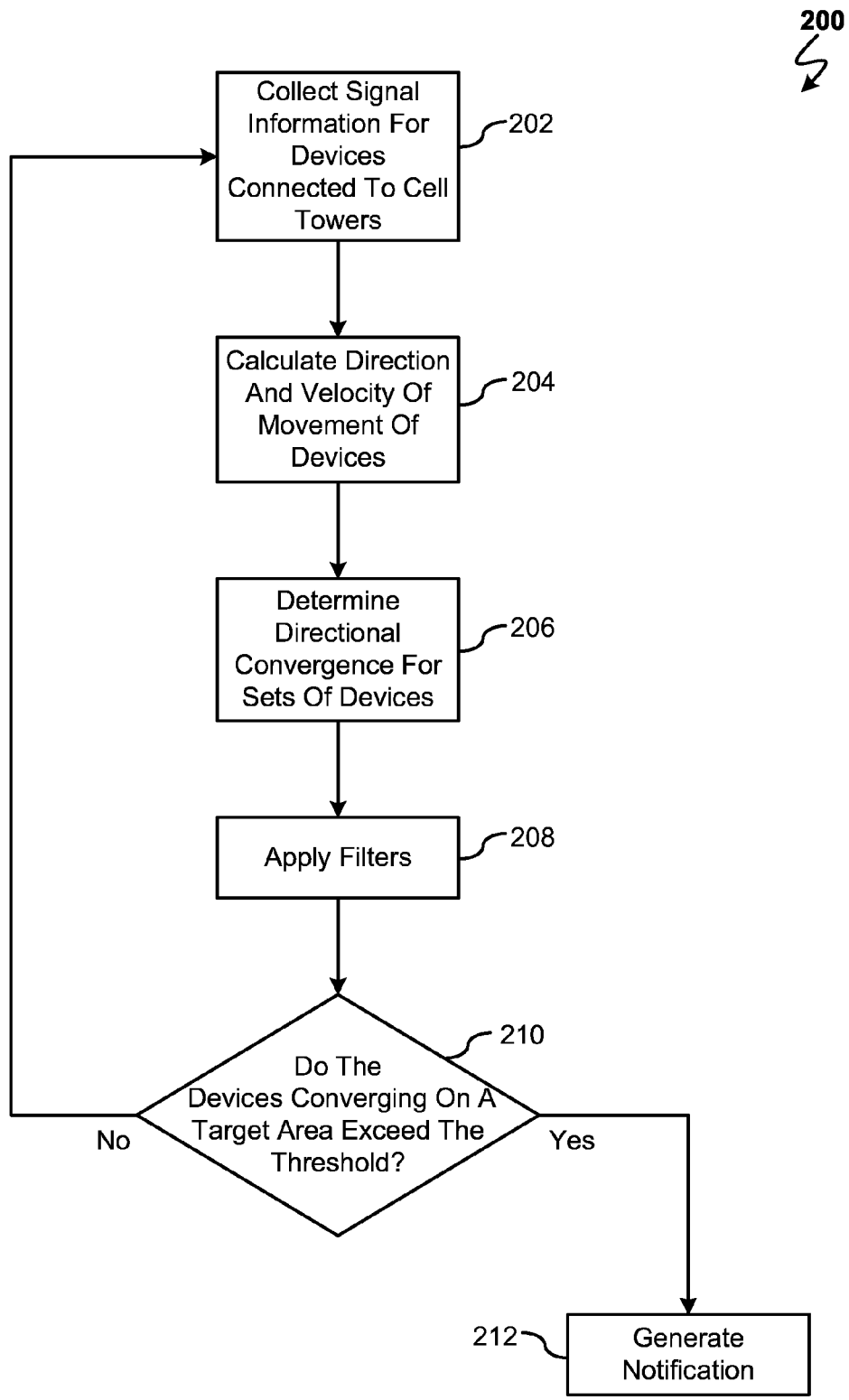
FIG. 2 is an operational flow chart illustrating a process for determining mobile device movement and concentration according to at least one embodiment.

Referring now to FIG. 2, an operational flow chart illustrating the exemplary process 200 by the crowd prediction program 108a and 108b (FIG. 1) according to at least one embodiment is depicted.

At 202, signal information for mobile cellular devices (e.g., smartphones, tablets, computers, etc.) detected by cell towers may be iteratively collected at intervals for analysis by an electronic device, such as a centralized server. According to at least one embodiment, cell towers may detect signal strength data for each mobile cellular device within the working range of the of the cell tower. Each mobile cellular device may have a unique identifier (e.g., electronic serial number (ESN)) that a cell tower may use to identify the source of the cellular signals within the cell tower's working range. Additionally, each cell tower may have a unique identifier (e.g., base station identity code (BSIC)) to identify an individual cell tower. A location data snapshot may be collected and stored by a server that may include information such as a mobile cellular device identifier, cell tower identifiers, mobile cellular device signal strength indicators and a timestamp indicating when the data may have been collected. Collected location data snapshots for multiple mobile cellular devices may then be stored in a data repository, such as a database contained in a server for analysis.

For example, a mobile cellular device having an ESN may produce a cellular signal detected by three cell towers (i.e., cell tower A, cell tower B and cell tower C). A location data snapshot may be collected containing data from each of the three cell towers. Within the location data snapshot may be signal strength data from cell tower A to the mobile cellular device (i.e., signal strength indicator A), from cell tower B to the mobile cellular device (i.e., signal strength indicator B), and from cell tower C to the mobile cellular device (i.e., signal strength indicator C). Additionally, the mobile cellular device's ESN, cell tower A's BSIC, cell tower B's BSIC, cell tower C's BSIC and a timestamp may be included in the location data snapshot. Subsequent location data snapshots may then be collected at fixed intervals, such as once a minute, and stored in a database.

Next, at 204, the direction and velocity of movement for mobile cellular devices may be calculated based multiple location data snapshots. According to at least one embodiment, signal strength data from multiple cell towers recorded in a single location data snapshot may be used to determine the location of a mobile cellular device at the time the location data snapshot may have been collected. The mobile cellular device's direction of movement and velocity of movement may be calculated by comparing the determined location for the mobile cellular device over multiple consecutive location data snapshots.

For example, signal strength data contained in a location data snapshot may be used to calculate a mobile cellular device's location through triangulation. By using multiple cell towers with known geographic locations, data corresponding to the signal strength from the mobile cellular device to nearby cell towers may be used to determine the relative location of the mobile cellular device at the time of the location data snapshot. Location data snapshots may include a cell tower's BSIC that may be used to look up the cell tower's geographic location in a data repository, such as a database, mapping cell tower locations to BSICs. Cell tower location and signal strength data may be used to then triangulate the mobile cellular device's location.

If a mobile cellular device's location may be determined in multiple data location snapshots, the mobile cellular device's direction and velocity of movement may then be determined based on tracking the mobile cellular device's change in location over time. For instance, at a first location data snapshot, a mobile cellular device $M_0$ may be located at point $X_1$. Then at a second location data snapshot, $M_0$ may be located at point $X_2$. Finally, at a third location data snapshot, $M_0$ may be located at point $X_3$. A geographic comparison of points $X_1$, $X_2$ and $X_3$ may indicate that point $X_2$ is southeast of point $X_1$, and that point $X_3$ is southeast of point $X_2$. Therefore, process 200 may determine that $M_0$'s direction of movement is generally southeast.

Furthermore, the mobile cellular device's velocity of movement may also be calculated based on the distance traveled, the time interval between location data snapshots and the previously determined direction of movement. If the distance from $X_1$ to $X_2$ is 1.2 miles and the distance from $X_2$ to $X_3$ is 0.8 miles, $M_0$'s total distance traveled may be two miles. If the fixed time interval between location data snapshots is one minute, $M_0$ traveled two miles in two minutes, or 60 miles per hour. With the calculated speed of movement and direction of movement, the mobile cellular device's velocity may be determined. For example, if the determined mobile cellular device speed is 60 miles per hour and the determined mobile cellular device direction of movement is southeast, the mobile cellular device's velocity may be 60 miles per hour southeast.

Then, at 206, calculated direction and velocity of movement data may be aggregated for each mobile cellular device to determine directional convergence for sets of mobile cellular devices. According to at least one embodiment, the mobile cellular device direction and velocity of movement calculated previously may be expressed as device movement vectors. Directional convergence may be calculated by determining the slope of the line for each device movement vector and then determining where the lines intersect. For example, three mobile cellular devices $M_1$, $M_2$ and $M_3$ may have device movement vectors $V_1$, $V_2$ and $V_3$ respectively. Then, an equation of a line $E_1$, $E_2$ and $E_3$ may be determined corresponding to each device movement vector $V_1$, $V_2$ and $V_3$. From $E_1$, $E_2$ and $E_3$, intersection points may be determined whereby the intersection points may indicate where $E_1$, $E_2$ and $E_3$ intersect and correspond to coordinates of a geographical location for each intersection point. Lines $E_1$ and $E_2$ may intersect at point $P_A$. Lines $E_1$ and $E_3$ may intersect at point $P_B$. Finally, lines $E_2$ and $E_3$ may intersect at point $P_C$.

Furthermore, the intersection points may be compared to determine if the intersection points fall within a predetermined threshold for convergence (e.g., intersection points are within 500 feet of each other). For example, in a scenario where the distance between $P_A$ and $P_B$ is 400 feet, the distance between $P_A$ and $P_C$ is 800 feet, the distance between $P_A$ and $P_C$ is 700 feet and the threshold for convergence is 500 feet, $P_A$ and $P_B$ fall within the convergence threshold. The intersection point $P_C$ may not fall within the convergence threshold and thus intersection points $P_A$ and $P_B$ may form a target area (i.e., convergence area).

At 208, intersection points may be filtered based on predetermined parameters (i.e., false positive error indicators) to reduce false positive errors. A false positive error may occur when a result appears to be positive when in fact the result is actually negative. As such, false positive errors may occur with respect to the present embodiment when a response to crowd formation may be triggered despite the conditions for triggering the response not having been met. In order to reduce false positive errors, filtering criteria may be implemented to ignore certain mobile cellular devices that may otherwise trigger a crowd formation response when the response may not be warranted. According to at least one embodiment, filtering may be implemented as a step preceding the prediction of a crowd formation event. According to at least one other embodiment, filtering may be implemented to occur after a crowd formation event is predicted.

According to at least one implementation, the mobile cellular devices (i.e., mobile device subset) converging on a target area located within an exempted geographical area may be filtered out and ignored. For example, if an exempted geographical area contains the location of a large public venue, such as a music concert, the mobile cellular devices corresponding to the target area may be ignored because a large crowd may already be expected. According to at least one other implementation, target areas may be filtered based on the time of day (i.e., time of day range). For example, a geographical area may have a risk of flash mobs forming late at night. Thus, the mobile cellular devices converging on a target area within the geographical area during daylight hours may be filtered out. It may be appreciated that other filtering criteria may be used depending on the circumstances that may generate false positive errors.

Next, at 210, the process 200 may determine if the mobile cellular devices that are converging on a target area exceed a predefined threshold value. According to at least one embodiment, the intersection points determined previously to form a target area may be compared to a predetermined threshold value for the number of mobile cellular devices converging on a target area (i.e., estimated crowd size). For example, if a predetermined threshold value for the number of mobile cellular devices is set at 205, and the number of mobile cellular devices converging on a target area is 211, the process may determine that the number of mobile cellular devices converging on a target area exceeds the predetermined threshold value.

According to at least one other embodiment, the predetermined threshold value may include demographic values (e.g., age) for the users of the mobile cellular devices converging on the target area. For example, the process 200 may request demographic data corresponding with user profiles associated with the mobile cellular devices present in the location data snapshots. According to at least one other embodiment, the predetermined threshold value may include the rate mobile cellular devices are convergence on a target area (i.e., rate of crowd growth value).

According to at least one other embodiment, the predetermined threshold value may include detecting a previously formed crowd moving to a new target area. The previously formed crowd may have been detected previously by the process 200 and monitored whether or not the process 200 reacted (e.g., by generating an alert) to the formation of the crowd based on filtering criteria. According to at least one implementation, the process 200 may continue to monitor the mobile cellular devices making up the previously formed crowd to determine if a number of the mobile cellular devices moving from the previously formed crowd to a new target area may exceed a predetermined number value. According to at least one other implementation, the process 200 may determine that a previously formed crowd may be moving to a new target area based on a percentage of the total previously formed crowd moving to the new target area. For example, for an existing crowd that includes 400 mobile cellular devices located within a current target area, the process 200 may determine that 119 mobile cellular devices from the crowd of 400 mobile cellular devices may be moving in a similar direction and may be converging on a new target area. If the predetermined threshold value is set at up to 25% of the mobile cellular devices making up the previously formed crowd moving to a new target area, the process may then determine that the 119 mobile cellular devices from the previously formed crowd that may be converging on a new target area exceeds the threshold value. It may be appreciated that other thresholds may be used as well as combinations of multiple thresholds.

If the mobile cellular devices converging on a target area exceed the predetermined threshold value at 210, the process 200 may trigger a notification or otherwise react at 212. According to at least one embodiment, a notification may be generated and sent to a target entity, such as a government agency, to warn of a possible crowd forming. The notification may include data such as the location of the target area, rate mobile cellular devices are convergence on a target area, the number of mobile cellular devices converging on the target area, and demographic data corresponding with the owners of the mobile cellular devices converging on the target area.

However, if the number of mobile cellular devices converging on a target area does not exceed the predetermined threshold value at 210, the process may return to 202 to continue collecting data.

Figure 3:
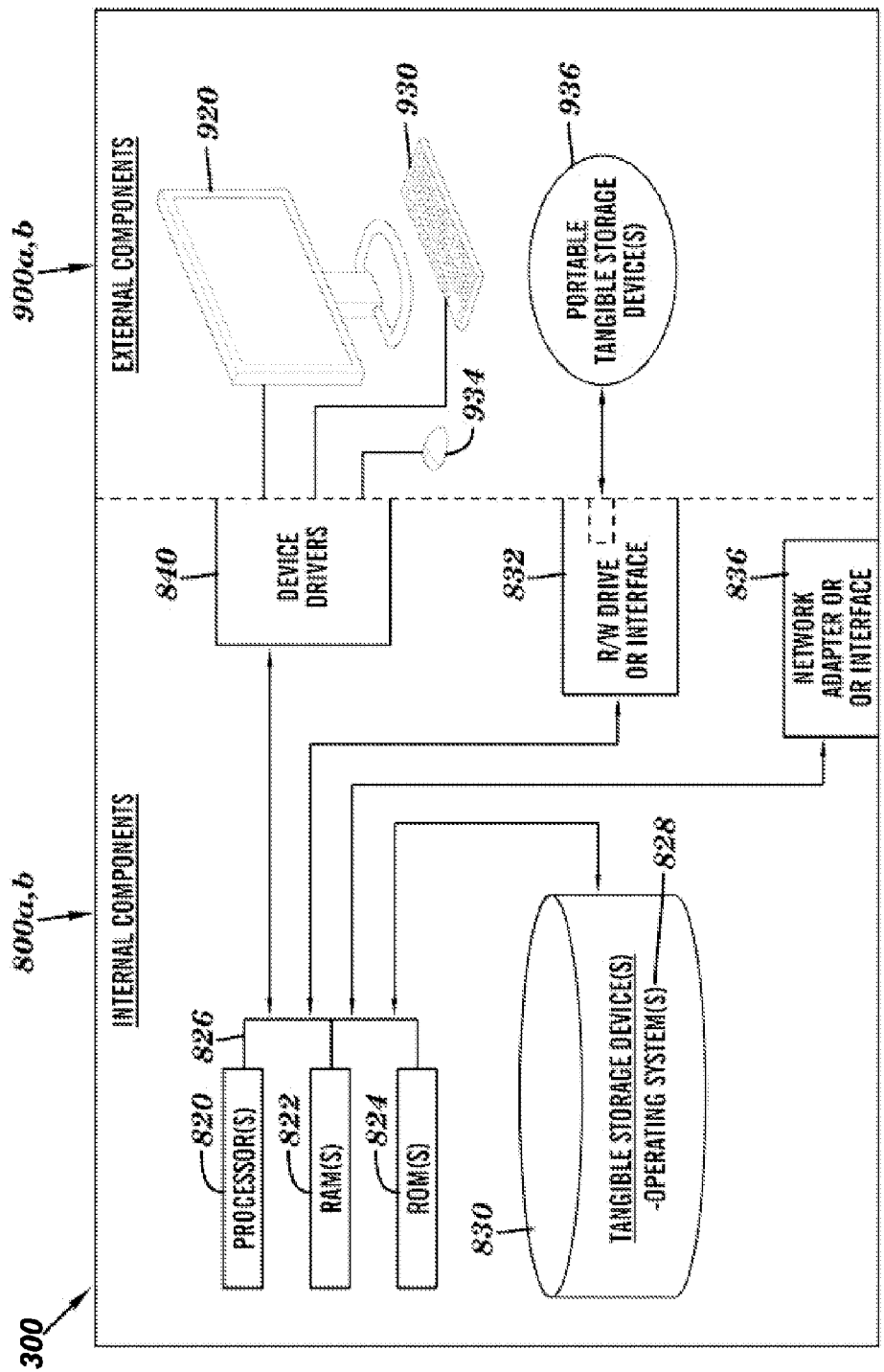
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a crowd prediction program 108a and 108b (FIG. 1), may be stored on one or more computer-readable tangible storage devices 830 for execution by one or more processors 820 via one or more RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The crowd prediction program 108a and 108b (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless wi-fi interface cards, or 3G or 4G wireless interface cards or other wired or wireless communication links. The crowd prediction program 108a (FIG. 1) in client computer 102 (FIG. 1) and the crowd prediction program 108b (FIG. 1) in network server computer 110 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the crowd prediction program 108a (FIG. 1) in client computer 102 (FIG. 1) and the crowd prediction program 108b (FIG. 1) in network server computer 110 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for predicting crowd formation based on the movement of a plurality of mobile devices, the method comprising:

collecting a plurality of location data snapshots based on the plurality of mobile devices and a plurality of cell towers;

requesting at least one demographic value from a user profile associated with at least one user using a mobile device within the plurality of mobile devices based on the collected plurality of location data snapshots;

receiving the requested at least one demographic value associated with the at least one user using the mobile device within the plurality of mobile devices;

determining a plurality of device positions corresponding with each mobile device within the plurality of mobile devices based on the collected plurality of location data snapshots;

determining a device movement direction corresponding with each mobile device within the plurality of mobile devices based on the determined plurality of device positions;

determining a device velocity corresponding with each mobile device within the plurality of mobile devices based on the determined plurality of device positions;

identifying a mobile device subset within the plurality of mobile devices, wherein the mobile device subset converges on a convergence area based on the determined device velocity corresponding with each mobile device within the plurality of mobile devices;

determining if the mobile device subset within the plurality of mobile devices converging on the convergence area exceeds a convergence threshold value;

determining if the received at least one demographic value associated with the at least one user using the mobile device within the identified mobile device subset exceeds a demographic threshold value; and triggering a convergence response based on determining the mobile device subset converging on the convergence area exceeds the convergence threshold value and determining that the received at least one demographic value associated with the at least one user using the mobile device within the identified mobile device subset exceeds a demographic threshold value.

2. The method of claim 1, further comprising:
filtering the mobile device subset based on at least one false positive error indicator.

3. The method of claim 1, wherein the collecting the plurality of location data snapshots comprises iteratively collecting the plurality of location data snapshots at a fixed time interval.

4. The method of claim 1, wherein the plurality of data snapshots comprises a plurality of cell tower identifiers corresponding with the plurality of cell towers, a plurality of mobile device identifiers corresponding with the plurality of mobile devices, a plurality of signal strength indicators, and a timestamp.

5. The method of claim 4, wherein the determining the plurality of device positions corresponding with each mobile device comprises triangulating the position of each mobile device based on the plurality of signal strength indicators.

6. The method of claim 2, wherein the at least one false positive error indicator comprises at least one of a time of day range and an exempted area.

7. The method of claim 1, wherein the convergence threshold value comprises at least one of an estimated crowd size, a rate of crowd growth value, and a convergence area location.

8. The method of claim 7, wherein the triggered convergence response comprises generating a notification containing at least one of the estimated crowd size, the rate of crowd growth value, the convergence area location, and the at least one demographic value.

9. The method of claim 1, wherein the convergence threshold value comprises detecting movement of an existing crowd to a new location.

10. A computer system for predicting crowd formation based on the movement of a plurality of mobile devices, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

collecting a plurality of location data snapshots based on the plurality of mobile devices and a plurality of cell towers;

requesting at least one demographic value from a user profile associated with at least one user using a mobile device within the plurality of mobile devices based on the collected plurality of location data snapshots;

receiving the requested at least one demographic value associated with the at least one user using the mobile device within the plurality of mobile devices;

determining a plurality of device positions corresponding with each mobile device within the plurality of mobile devices based on the collected plurality of location data snapshots;

determining a device movement direction corresponding with each mobile device within the plurality of mobile devices based on the determined plurality of device positions;

determining a device velocity corresponding with each mobile device within the plurality of mobile devices based on the determined plurality of device positions;

identifying a mobile device subset within the plurality of mobile devices, wherein the mobile device subset converges on a convergence area based on the determined device velocity corresponding with each mobile device within the plurality of mobile devices;

determining if the mobile device subset within the plurality of mobile devices converging on the convergence area exceeds a convergence threshold value;

determining if the received at least one demographic value associated with the at least one user using the mobile device within the identified mobile device subset exceeds a demographic threshold value; and triggering a convergence response based on determining the mobile device subset converging on the convergence area exceeds the convergence threshold value and determining that the received at least one demographic value associated with the at least one user using the mobile device within the identified mobile device subset exceeds a demographic threshold value.

11. The computer system of claim 10, further comprising: filtering the mobile device subset based on at least one false positive error indicator.

12. The computer system of claim 10, wherein the collecting the plurality of location data snapshots comprises iteratively collecting the plurality of location data snapshots at a fixed time interval.

13. The computer system of claim 10, wherein the plurality of data snapshots comprises a plurality of cell tower identifiers corresponding with the plurality of cell towers, a plurality of mobile device identifiers corresponding with the plurality of mobile devices, a plurality of signal strength indicators, and a timestamp.

14. The computer system of claim 13, wherein the determining the plurality of device positions corresponding with each mobile device comprises triangulating the position of the mobile device based on the plurality of signal strength indicators.

15. The computer system of claim 11, wherein the at least one false positive error indicator comprises at least one of a time of day range and an exempted area.

16. The computer system of claim 10, wherein the convergence threshold value comprises at least one of an estimated crowd size, a rate of crowd growth value, and a convergence area location.

17. A computer program product for predicting crowd formation based on the movement of a plurality of mobile devices, comprising:

one or more computer-readable storage medium and program instructions stored on at least one of the one or more tangible storage medium, the program instructions executable by a processor, the program instructions comprising:

program instructions to collect a plurality of location data snapshots based on the plurality of mobile devices and a plurality of cell towers;

program instructions to request at least one demographic value from a user profile associated with at least one user using a mobile device within the plurality of mobile devices based on the collected plurality of location data snapshots;

program instructions to receive the requested at least one demographic value associated with the at least one user using the mobile device within the plurality of mobile devices;

program instructions to determine a plurality of device positions corresponding with each mobile device within the plurality of mobile devices based on the collected plurality of location data snapshots;

program instructions to determine a device movement direction corresponding with each mobile device within the plurality of mobile devices based on the determined plurality of device positions;

program instructions to determine a device velocity corresponding with each mobile device within the plurality of mobile devices based on the determined plurality of device positions;

program instructions to identify a mobile device subset within the plurality of mobile devices, wherein the mobile device subset converges on a convergence area based on the determined device velocity corresponding with each mobile device within the plurality of mobile devices;

program instructions to determine if the mobile device subset within the plurality of mobile devices converging on the convergence area exceeds a convergence threshold value;

program instructions to determine if the received at least one demographic value associated with the at least one user using the mobile device within the identified mobile device subset exceeds a demographic threshold value; and program instructions to trigger a convergence response based on determining the mobile device subset converging on the convergence area exceeds the convergence threshold value and determining that the received at least one demographic value associated with the at least one user using the mobile device within the identified mobile device subset exceeds a demographic threshold value.

18. The computer program product of claim 17, further comprising:

program instructions to filter the mobile device subset based on at least one false positive error indicator.

19. The computer program product of claim 17, wherein the program instructions to collect the plurality of location data snapshots comprises iteratively collecting the plurality of location data snapshots at a fixed time interval.

20. The computer program product of claim 17, wherein the plurality of data snapshots comprises a plurality of cell tower identifiers corresponding with the plurality of cell towers, a plurality of mobile device identifiers corresponding with the plurality of mobile devices, a plurality of signal strength indicators, and a timestamp.

* * * * *